United States Patent
Puttichaem et al.

(10) Patent No.: US 9,902,023 B1
(45) Date of Patent: Feb. 27, 2018

(54) SYSTEMS AND DEVICES FOR ACHIEVING HIGH THROUGHPUT ATTACHMENT AND SUB-MICRON ALIGNMENT OF COMPONENTS

(71) Applicant: Western Digital (Fremont), LLC, Fremont, CA (US)

(72) Inventors: Wachira Puttichaem, Muang (TH); Sarawut Waiyawong, Bang Pa-In (TH)

(73) Assignee: Western Digital (Fremont), LLC, Fremont, CA (US)

( * ) Notice: Subject to any disclaimer, the term of this patent is extended or adjusted under 35 U.S.C. 154(b) by 202 days.

(21) Appl. No.: 14/748,607

(22) Filed: Jun. 24, 2015

Related U.S. Application Data

(60) Provisional application No. 62/069,635, filed on Oct. 28, 2014.

(51) Int. Cl.
*B23K 37/04* (2006.01)
*G11B 5/48* (2006.01)

(52) U.S. Cl.
CPC .............. *B23K 37/04* (2013.01); *G11B 5/488* (2013.01)

(58) Field of Classification Search
CPC ............. H01L 21/6838; H01L 21/6831; B25B 11/005; B25B 2201/40; B23K 2201/40
USPC ............................................. 228/121; 279/3
See application file for complete search history.

(56) References Cited

U.S. PATENT DOCUMENTS

| | | | |
|---|---|---|---|
| 5,324,053 A * | 6/1994 | Kubota | B23Q 3/154 269/8 |
| 5,413,360 A | 5/1995 | Atari et al. | |
| 6,016,949 A | 1/2000 | Slesinger | |
| 6,032,997 A * | 3/2000 | Elliott | B25B 11/005 269/21 |
| 6,335,863 B1 | 1/2002 | Yamamoto et al. | |
| 6,886,997 B2 | 5/2005 | Cheung et al. | |
| 6,895,027 B2 | 5/2005 | Treusch et al. | |
| 7,172,676 B2 | 2/2007 | DeMeter | |
| 7,196,356 B2 | 3/2007 | Ishii et al. | |
| 7,223,617 B2 | 5/2007 | Mochida et al. | |
| 7,337,939 B2 | 3/2008 | Terada et al. | |
| 7,449,905 B2 | 11/2008 | Shi et al. | |
| 7,502,397 B2 | 3/2009 | Naganuma | |
| 7,522,649 B2 | 4/2009 | Ha et al. | |
| 7,524,390 B2 | 4/2009 | DeMeter et al. | |
| 7,548,673 B2 | 6/2009 | Azimi et al. | |
| 7,642,121 B2 | 1/2010 | Slater, Jr. et al. | |
| 7,921,436 B2 | 4/2011 | Shimizu et al. | |

(Continued)

OTHER PUBLICATIONS

Lei Wang et al., U.S. Appl. No. 13/664,271, filed Oct. 30, 2012, 28 pages.

(Continued)

*Primary Examiner* — Erin B Saad
(74) *Attorney, Agent, or Firm* — Loza & Loza, LLP; Gabriel Fitch

(57) ABSTRACT

Systems and devices for achieving high throughput attachment of sub-micron alignment of components are provided. One such device can include a fixture for holding a chuck, the fixture including a plurality of alignment features for adjusting a position of the chuck, the chuck includes a top layer including a vacuum aperture for holding a first component and a bottom layer made from a translucent material, wherein the bottom layer is directly attached to the top layer.

18 Claims, 4 Drawing Sheets

(56) References Cited

U.S. PATENT DOCUMENTS

| | | |
|---|---|---|
| 8,193,634 B2 | 6/2012 | Wong et al. |
| 8,456,961 B1 | 6/2013 | Wang et al. |
| 8,593,914 B2 | 11/2013 | Wang et al. |
| 2002/0089913 A1 | 7/2002 | Moriyama et al. |
| 2007/0015313 A1 | 1/2007 | Kwak et al. |
| 2011/0083786 A1* | 4/2011 | Guo .................. B32B 37/0007 156/64 |
| 2014/0159325 A1 | 6/2014 | Parkhe et al. |

OTHER PUBLICATIONS

Chee Kheng Lim, U.S. Appl. No. 14/216,458, filed Mar. 17, 2014, 26 pages.

\* cited by examiner

SYSTEMS AND DEVICES FOR ACHIEVING HIGH THROUGHPUT ATTACHMENT AND SUB-MICRON ALIGNMENT OF COMPONENTS

CROSS-REFERENCE TO RELATED APPLICATION(S)

This application claims priority to and the benefit of U.S. Provisional Application No. 62/069,635 filed on Oct. 28, 2014, entitled, "LASER DIODE AND SUBMOUNT ASSEMBLY CHUCK WITH SILICON CARBIDE, SAPPHIRE, AND PLASTIC SHIM", the entire content of which is incorporated herein by reference.

BACKGROUND

Heat assisted magnetic recording (HAMR) technology for use in a data storage device involves use of a laser heating source to provide additional energy during the data writing process (e.g., as data is written to a magnetic media disk). The energy/heat source is typically implemented using a semiconductor laser diode chip bonded on a sub-mount chip which, when the laser diode and sub-mount are considered together after bonding, is referred to as a Chip-On-Submount-Assembly or COSA. The COSA is then attached to a magnetic head slider and the light energy from the laser diode chip is guided to the air bearing surface of the slider through a waveguide disposed in the slider to heat up the magnetic media for writing.

DETAILED DESCRIPTION

Some embodiments include systems and devices for achieving high throughput attachment and sub-micron alignment of components. One example of a system and device to achieve this is in regard the assembly of components for COSA and COSA to slider bonding process. The COSA and COSA to slider bonding process both involve a high accuracy type alignment and bonding, which is preferably accurate to submicron levels or better. The bonding process itself can involve a eutectic or epoxy type attachment. The high accuracy bonding is needed to ensure that the output of a semiconductor laser diode chip (e.g. production laser, laser diode, HAMR laser, second component) is aligned to the entry point of the waveguide in the slider, and to thereby ensure that maximum light energy is transferred from the laser to the waveguide in the slider. The alignment accuracy determines the amount of energy channeled into the waveguide and therefore an efficiency of the assembly as a whole. When the alignment is poor, more energy is needed from the laser diode to ensure sufficient energy is channeled through the waveguide to heat the media. Thus, poor alignment leads to low energy efficiency and higher than needed light energy. Accordingly, systems and methods for achieving high throughput attachment and accurate alignment of components for HAMR are needed.

COSA production of HAMR requires a COSA bonding process which applies the laser energy through a chuck to heat up a submount (e.g. second component) to melt a bonding material (e.g. solder) positioned between a laser diode and a submount to bond the laser diode and submount. This system and process will be further described below in relation to FIG. 7.

Figure 1:
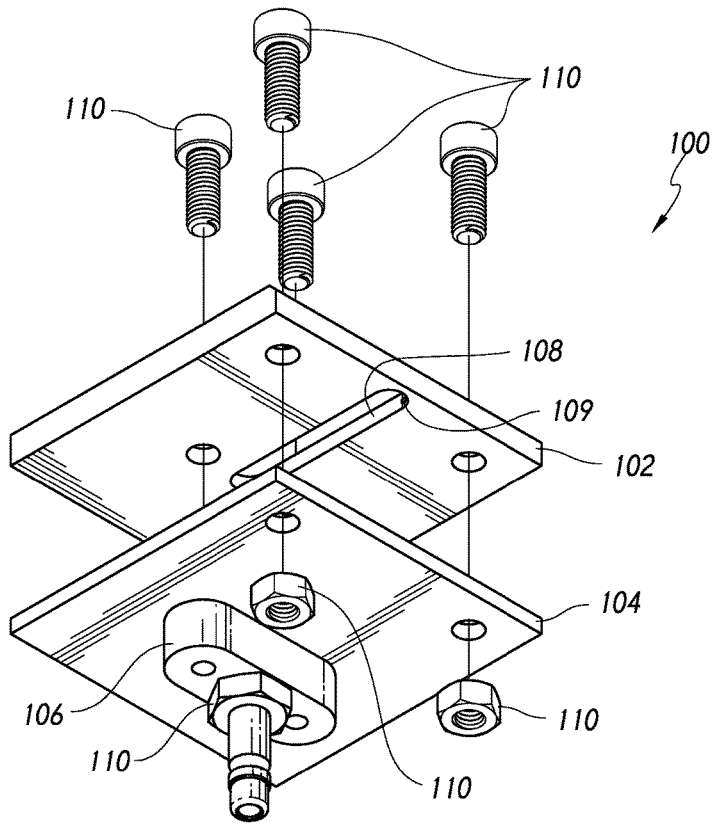
FIGS. 1 and 2 illustrate a perspective and expanded views of a chuck used for component bonding according to one embodiment.
Figure 2:
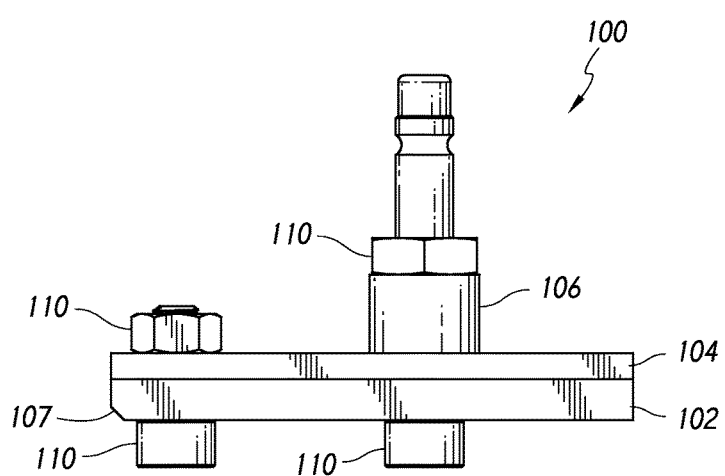

FIGS. 1 and 2 illustrate a perspective and expanded views of a chuck used for component bonding according to one embodiment. The chuck 100 can include a top layer 102, where the top layer 102 can be made of a material having one or more of the following characteristics: sufficient thermal conductivity, high temperature strength, and low displacement material. High thermal conductivity, for example, can be between 50 to 200 W/(m·K). High temperature strength, for example, can have a specific heat between 600 to 800 J/(kg·K). Low displacement material, for example, can have a coefficient of linear thermal expansion between 40-800° C. less than $5 \times 10^{-6}/°$ C. One example of material used for the top layer 102 is silicon carbide. The top layer 102 can have a thickness between 0.8-1.2 mm.

The chuck can include a bottom layer 104 connected to the first layer 102. The bottom layer 104 can be made of material having one or more of the following characteristics: transparent, high temperature strength, low thermal expansion, and high compressive strength. Transparent material, for example, can be a material that has a percent transmittance more than 95% for 500 nm to 1500 nm wavelength laser. High temperature strength, for example, can have a specific heat between 600 to 800 J/(kg·K). Low thermal expansion, for example, can have a coefficient of linear thermal expansion between 40-800° C. less than $6 \times 10^{-6}/°$ C. And, high compressive strength material, for example, can be a material having a compressive strength between 2,000 to 3,000 MPa. One example of material that can be used for bottom layer 104 is glass sapphire. The bottom layer 104 can have a thickness between 0.3-1.0 mm.

Chuck 100 can also include vacuum nozzle 106, vacuum cavity 108, and vacuum hole 109 to retain a first component (reference numeral 142 in FIG. 7) on the chuck top layer 102 during component attachment. Vacuum nozzle 106 can be attached to bottom layer 104 and in fluid communication with vacuum cavity 108 formed in top layer 102. Top layer 102 can also include vacuum hole 109 in fluid communication with vacuum cavity 108. The vacuum hole 109 can be configured to facilitate a vacuum pressure on the first component.

Chuck 100 can also include fastener assembly 110. Fastener assembly 110 can include a plurality of fasteners meant for attaching the top layer 102 and bottom layer 104, and further for securing the vacuum nozzle 106 to the chuck 100. A fastener (as used in this detailed description) can include, but is not limited to, any combination of nut, bolt, stud, weldment, washer, rivet, nail, screw, or the like. One skilled in the art can appreciate that vacuum nozzle 106, vacuum cavity 108 and vacuum hole 109 can be modified in structure and location in chuck 100 to achieve the goal of securing a component to chuck 100.

Figure 3:
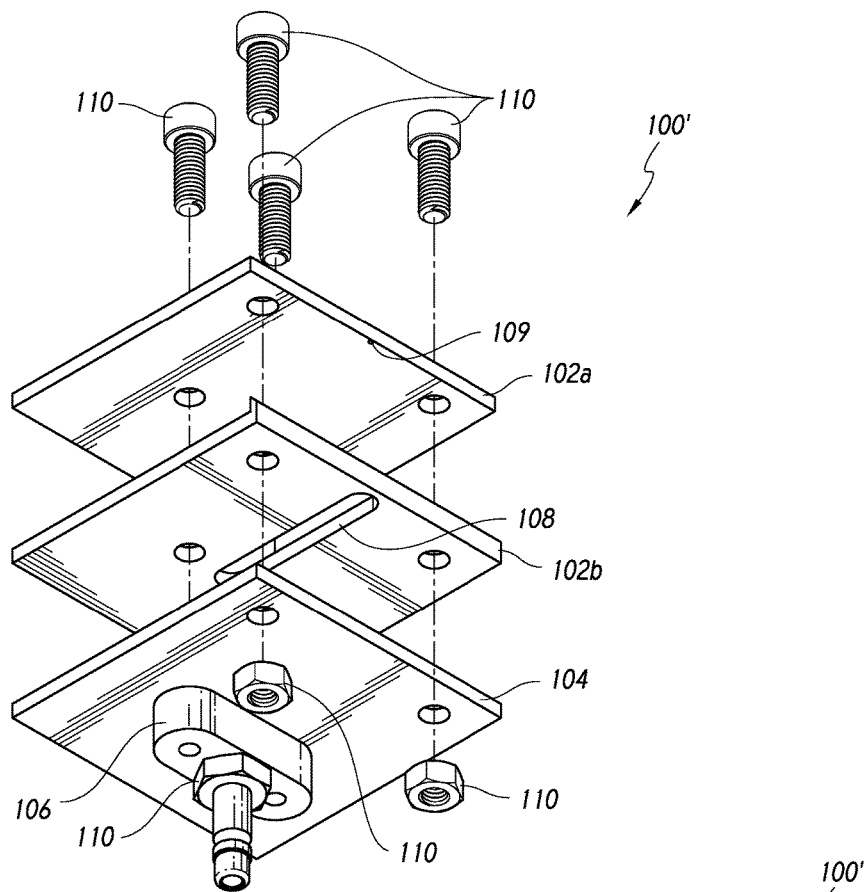
FIGS. 3 and 4 illustrate a perspective and expanded views of another chuck used for component bonding according to one embodiment.
Figure 4:
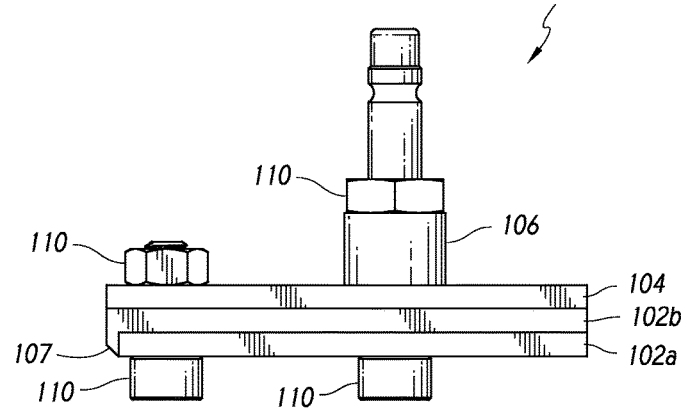

FIGS. 3 and 4 illustrate a perspective and expanded views of another chuck 100' used for component bonding according to one embodiment. Chuck 100' is similar to chuck 100, and therefore common features that have the same reference numeral will not be described. Chuck 100' can include a top layer 102 that has a first layer 102a and second layer 102b. Second layer 102b can be positioned between first layer 102a and bottom layer 104. First layer 102a can be made of material having one or more of the following characteristics: low thermal conductivity, low temperature strength, and has a high thermal expansion. Low thermal conductivity, for example, can be between 2 to 5 W/(m·K). Low temperature strength material, for example, can have a specific heat between 460 to 480 J/(kg·K). A low coefficient of thermal expansion, for example, can be between 40-800° C. less than $12 \times 10^{-6}/°$ C. One example of material that can be used for first layer 102a is zirconia. First layer 102a can have a thickness between 0.3-0.7 mm.

Second layer 102b can be made of material having one or more of the following characteristics: low thermal conductivity, high temperature strength, and low displacement material. Low thermal conductivity material, for example, can be between 1.3-1.5 W/(m·° C.). High temperature strength material, for example, can be a specific heat between 0.6-0.85 J/(kg·° C.). Low displacement material, for example, can have a coefficient of linear thermal expansion between 25-800° C. less than $123 \times 10^{-7}/°$ C. The thickness of second layer 102b can be between 0.3-0.7 mm. One example of material that can be used for first layer 102b is machinable ceramic glass. Further, the vacuum hole 109 can extend through second layer 102b.

Figures 5A, 5B:
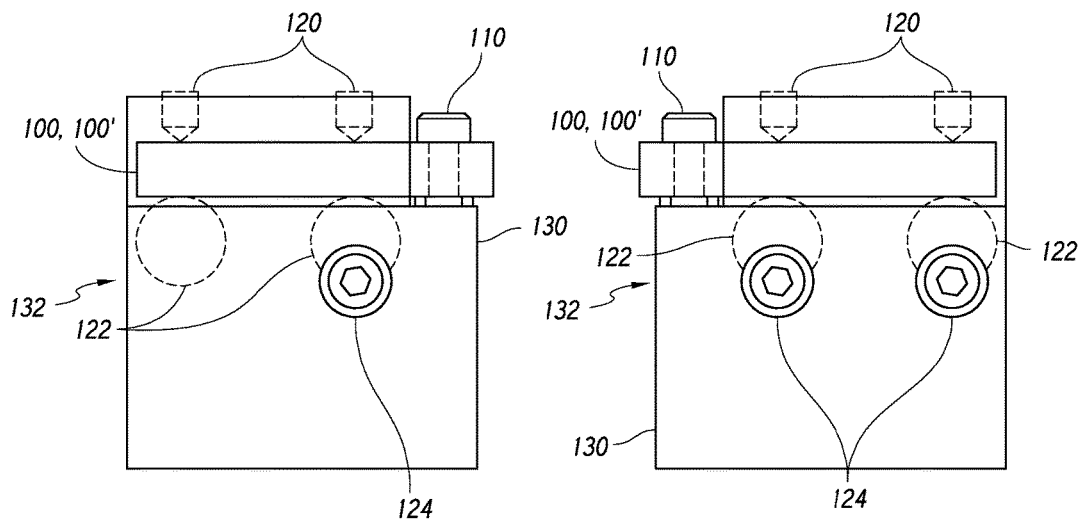
FIGS. 5a and 5b illustrate a side view of a component bonding fixture according to one embodiment.

FIGS. 5a and 5b illustrate a side view of component bonding fixture 132 according to one embodiment. Component bonding fixture 132 can include a chuck housing 130, chuck 100/100', and alignment features 120, 122, and 124. The chuck housing 130 can be made of aluminum or stainless steel, and can be structured to substantially contain chuck 100/100' except for portions of chuck 100 that are proximate to an assembly heating element (e.g., an assembly laser, a conductive heating device, a microwave heating device, an ultraviolet light heating device) 148 (see FIG. 7) and areas where the first and second component are placed on the chuck 100/100' (see FIG. 7). The component bonding fixture 132 can also include alignment features 120, 122, and 124, which function to finely position chuck 100/100'. Alignment feature 120 (e.g. or top level fastener), can contact one or more locations of the chuck top layer 102. By adjusting the alignment feature 120, the alignment feature 120 can contact and alter the position of the chuck 100/100'. Alignment features 122 (e.g. leveling ball) and 124 (e.g. side leveling fastener), can contact various locations of the chuck bottom layer 104. By adjusting the alignment feature 124, the alignment feature 124 will contact the alignment feature 122, which will contact and alter the position of chuck 100/100'.

Figure 6:
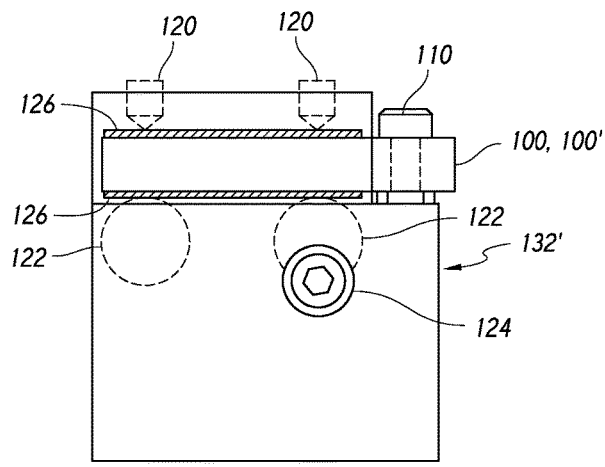
FIG. 6 illustrates a side view of another component bonding fixture including an absorption layer according to one embodiment.

FIG. 6 illustrates a side view of component bonding fixture 132', which includes a stress absorption layer 126 according to one embodiment. Component bonding fixture 132' is similar to component bonding fixture 132, and therefore common features that have the same reference numeral will not be described. The stress absorption layer 126 can be made of a high quality plastic material that can reduce compression (less than 0.15% displacement at 500 psi compressions) from alignment features 120 and 122. The thickness of the stress absorption layer can be approximately between 0.010-0.012 inches. The stress absorption layer 126 can be positioned between the alignment feature 120 and the chuck top layer 102. Further, the stress absorption layer 126 can be positioned between the alignment feature 122 and the chuck bottom layer 104. Stress absorption layer 126 can be structured to have a length long enough to extend to a position between the alignment feature 120, alignment feature 122, and chuck 100/100' in order to reduce stress imposed by those components on chuck 100/100'. Component bonding fixture 132' can include one or more stress absorption layers 126 without departing from the scope of the disclosure.

Figure 7:
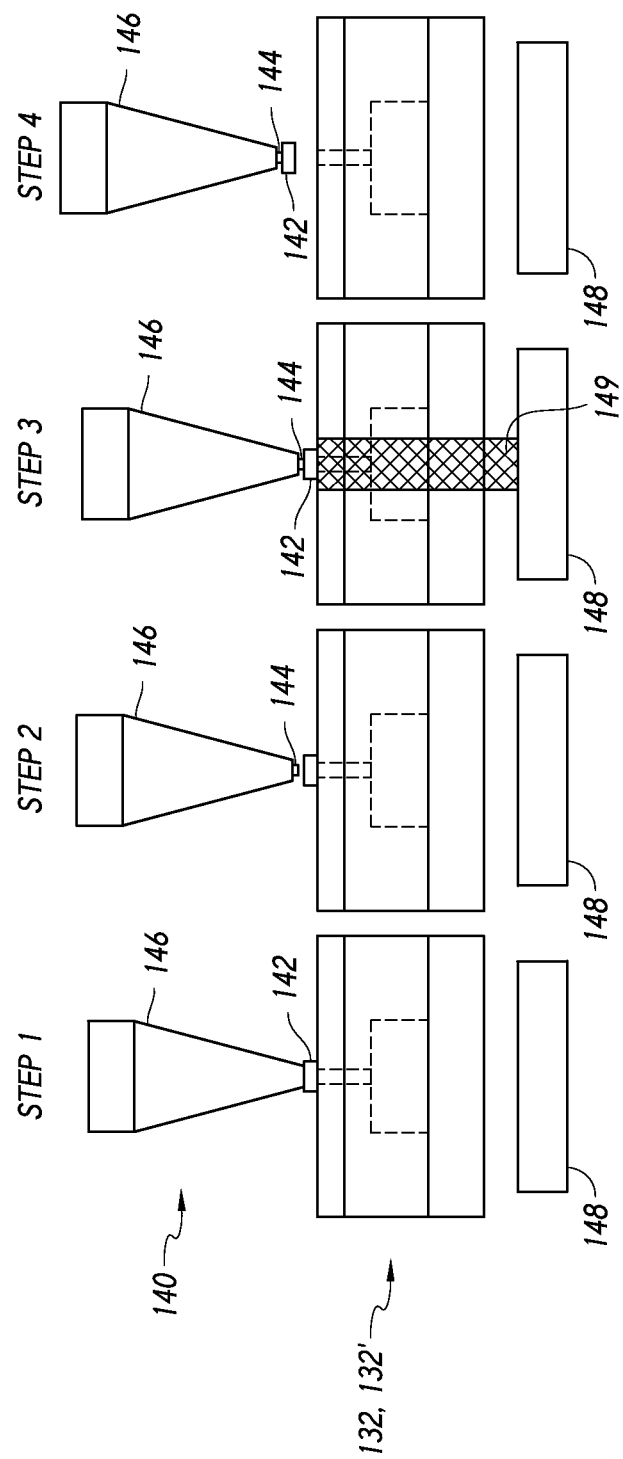
FIG. 7 illustrates a sequence of front views of a system and process for bonding components according to one embodiment.

FIG. 7 illustrates one example of a sequence of front views of a system 140 and process for bonding components, using component bonding fixture 132/132' and chuck 100/100' according to one embodiment. This system 140 has been simplified for the purposes of illustrating one use of component bonding fixture 132/132' and chuck 100/100'. The system for bonding components 140 can include a pick up tool 146, component bonding fixture 132/132' and assembly heating element 148 (for bonding a first component 142 to a second component 144). First, in Step 1, the pick up tool 146 picks up the first component and places it on bonding fixture 132/132, preferably on the vacuum hole 109 (not shown). Prior to the pick up tool releasing the first component 142, the vacuum nozzle 106 is turned on creating a suction force at vacuum hole 109 in order to secure the first component 142 to chuck 100/100'. Next, in Step 2, the pick up tool 146 picks up the second component 144 and places it on the first component 142. The pick up tool 146 pushes the second component 144 down onto the first component 142 with a sufficient amount of force to ensure proper bonding in the Step 3. In Step 3, the assembly heating element 148 is turned on to deliver heat energy 149 through chuck 100/100' to the first component 142. The heat energy 149 is transferred through the first component 142 to activate a bonding material between the first component 142 and second component 144. In Step 4, after the bonding of first component 142 and second component 144 is finished, the pick up tool 146 moves the finished assembly to another staging area.

As mentioned above, system 140 has been simplified for illustration purposes. Those skilled in the art will appreciate that system 140 can include various sensors and processors to enable the system to properly work to ensure high throughput and sub-micron alignment. For example, in Step 2, in order to properly align the first component 142 and second component 144, the system can include a vision or sensor system to enable sub-micron alignment of the components in relation to each other. For example, components can be brought close together using a distance sensor. The distance sensor can scan across the bottom surface of the first component 142 and the bottom surface of the second component 144 to determine a relative distance or offset between them. The relative offset between the components can be measured by the distance sensor and corrected by one or both the pick up tool 146 and chuck 100/100' until a desired alignment is achieved. After a sufficient alignment is achieved, the second component 144 can be brought toward the first component 142. Further, in Step 3, the system 140 can include a force control sensor which is configured to sense a contact force between the first component 142 and second component 144.

In one embodiment, the alignment process of Step 2 can be thought of as a passive alignment stage. In other embodiments, the process can use active alignment to align the components prior to bonding. In one example, a waveguide configured to receive light and a sensor coupled to the waveguide can be used for alignment. More specifically, the sensor can provide information indicative of an amount of light received by the waveguide of the slider.

In one embodiment, the process can perform the sequence of actions in a different order. In another embodiment, the process can skip one or more of the actions. In other embodiments, one or more of the actions are performed simultaneously. In some embodiments, additional actions can be performed.

A processor can be coupled electrically to the first component 142, the second component 144, the assembly heat element 148, the pick up tool 146, a force control sensor, a distance sensor, and a high resolution camera. The processor can be coupled to other components as well. The processor can be coupled to the vacuum nozzle 106 and configured to continuously apply a vacuum pressure to the chuck 100/100' to hold the first component 142, during such vacuum pressure application, to aid in alignment of the first component 142 and second component 144. A processor can also be coupled to the pick up tool 146 to bring the first component 142 and second component 144 into contact. Further, a processor can be coupled to assembly heat element 148, to control laser power during the bonding process. In several embodiments, such a processor can effectively execute some or all of the aforementioned operational steps of the system 140 of FIG. 7.

In this context, the processor refers to any machine or selection of logic that is capable of executing a sequence of instructions and should be taken to include, but not limited to, general purpose microprocessors, special purpose microprocessors, central processing units (CPUs), digital signal processors (DSPs), application specific integrated circuits (ASICs), signal processors, microcontrollers, and other suitable circuitry. Further, it should be appreciated that the term processor, microprocessor, circuitry, controller, and other such terms, refer to any type of logic or circuitry capable of executing logic, commands, instructions, software, firmware, functionality, or other such information. In some embodiments, a processor may be a computer.

The aforementioned description can be used in the bonding of components of a HAMR slider. For example, a sub-mount (first component 142) can be bonded to a HAMR laser (second component 144), to form a COSA. Further, the aforementioned description can be used in bonding a COSA (first component 142) to slider (second component 144) to form a HAMR slider. This can significantly reduce the machine cost by performing two bonding processes with one equipment set.

In several embodiments, the HAMR slider is can be useful for use within a hard disk drive to effect heat assisted magnetic recording. In other embodiments, the bonding of components can be suited for other applications (e.g., other micro-scale semiconductor chip applications involving use of a laser).

Both chuck 100 and 100' were tested and found to have performed superior in specific metrics related to the system bonding process. For example, the use of a bottom layer 104 having translucent properties enabled the chuck 100/100' to perform bonding process with lower laser power for longer time without significant degradation of the chuck 100/100'. Further, use of top layer 102 material as described above resulted in a more robust chuck 100/100'. For example, there was less damage to the vacuum hole 109, thus increasing the alignment accuracy (e.g., maintaining position of first component or centering sigma).

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example embodiments. The example systems and components described herein may be configured differently than described. For example, elements may be added to, removed from, or rearranged compared to the disclosed example embodiments.

What is claimed is:

1. A device for bonding electrical components, comprising:
   a chuck including:
      a top layer including a vacuum hole for holding a component, and
      a bottom layer comprising a translucent material, wherein the bottom layer is directly attached to the top layer; and
   a fixture for holding the chuck, the fixture including a plurality of alignment features for adjusting a position of the chuck.

2. The device of claim 1, wherein the top layer comprises silicon carbide.

3. The device of claim 1, wherein the translucent material comprises glass sapphire.

4. The device of claim 1, further including a first stress absorption layer positioned between at least one of the plurality of alignment features and the chuck.

5. The device of claim 1, further including a first stress absorption layer positioned between the top layer and at least one of the plurality of alignment features, and a second stress absorption layer positioned between the bottom layer and at least one of the plurality of alignment features.

6. The device of claim 1, wherein the top layer includes a first layer and a second layer.

7. The device of claim 6, wherein the first layer of the top layer comprises zirconia.

8. The device of claim 7, wherein the second layer of the top layer comprises machinable glass ceramic.

9. The device of claim 6, wherein the translucent material comprises glass sapphire.

10. A device for bonding components, comprising:
    a chuck including:
       a top layer including a vacuum hole for holding an electrical component, and
       a bottom layer comprising a translucent material, wherein the bottom layer is directly attached to the top layer; and
    a fixture for holding the chuck, the fixture including a plurality of alignment features for adjusting a position of the chuck; and
    a first stress absorption layer positioned between the chuck and the fixture.

11. The device of claim 10, wherein the top layer comprises silicon carbide.

12. The device of claim 10, wherein the bottom layer comprises glass sapphire.

13. The device of claim 10, wherein the first stress absorption layer is positioned between the top layer of the chuck and the fixture, and wherein the device further comprises a second stress absorption layer that is positioned between the bottom layer of the chuck and the fixture.

14. The device of claim 10, wherein the top layer includes a first layer and a second layer, the first layer of the top layer comprises zirconia, and the second layer of the top layer comprises machinable glass ceramic.

15. The device of claim 14, wherein the bottom layer comprises glass sapphire.

16. The device of claim 1, wherein the top layer is substantially parallel to the bottom layer.

17. The device of claim 1, wherein the top layer and the bottom layer are each substantially flat.

18. The device of claim 1, wherein the top layer comprises a first material and the bottom layer comprises a second material different from the first material.

* * * * *